United States Patent [19]

Kishi

[11] Patent Number: 5,450,918
[45] Date of Patent: Sep. 19, 1995

[54] LATERALLY MOVABLE MECHANISM OF A VEHICLE

[75] Inventor: Mitsuhiro Kishi, Ashikaga, Japan

[73] Assignee: Jspanic Corporation, Tochigi, Japan

[21] Appl. No.: 171,029

[22] Filed: Dec. 21, 1993

[30] Foreign Application Priority Data

Jun. 22, 1993 [JP] Japan .................. 5-174832

[51] Int. Cl.⁶ .......................... B60S 9/215
[52] U.S. Cl. ........................ 180/202; 280/761
[58] Field of Search ........... 180/199, 200, 202; 280/761, 762, 765.1, 767, 766.1, 764.1, 763.1

[56] References Cited

U.S. PATENT DOCUMENTS

| 4,564,209 | 1/1986 | Kingsley et al. | 180/199 X |
| 4,998,595 | 3/1991 | Yeh | 180/202 |

FOREIGN PATENT DOCUMENTS

| 1046359 | 12/1953 | France | 180/200 |
| 1267145 | 10/1958 | France | 180/202 |
| 1139043 | 3/1959 | Germany | 180/202 |
| 1802050 | 4/1970 | Germany | 180/202 |

*Primary Examiner*—Karin L. Tyson
*Assistant Examiner*—F. Zeender
*Attorney, Agent, or Firm*—Flynn, Thiel, Boutell & Tanis

[57] ABSTRACT

A laterally movable mechanism for moving a vehicle in a direction perpendicular to the traveling direction by a slide mechanism attached to the vehicle chassis. Laterally movable mechanisms are disposed at front and rear portions of the chassis, and each movable mechanism includes a pair of lifting devices capable of lifting the chassis upward, and a slide device is connected to the lower portion of the lifting devices and is capable of moving laterally while contacting the ground.

2 Claims, 6 Drawing Sheets

LATERALLY MOVABLE MECHANISM OF A VEHICLE

FIELD OF THE INVENTION

The present invention relates to a laterally movable mechanism of a vehicle provided with a construction machine or earth machine thereon for moving the vehicle in a direction perpendicular to the traveling direction of the vehicle, namely, in a lateral direction relative to the traveling direction of the vehicle.

BACKGROUND OF THE INVENTION

There has been conventionally employed a vehicle having tires or crawlers attached to the lower part thereof for contacting a road or the ground whereby a chassis of the vehicle is movable freely on the road or ground. The prior art vehicle of this type has such a structure that the driving force is generated by turning the tires or the crawlers and the tires are turned in a different direction by a steering wheel or the crawlers are turned in a different direction by generating different revolutions in both crawlers. Such a propelled vehicle has an object to travel fast if it travels straight or carries a load from one point to another point. To achieve the object, the prior art vehicle has a structure intended only to facilitate operability in the traveling direction. This is caused by the fact that the prior art vehicle emphasizes straight traveling on a highway or public road and is manufactured to meet this intention.

However, there is a case where the vehicle travels not only straight, but also moves in a lateral direction perpendicular to the normal traveling direction. For example, there is a case where the vehicle loaded with a construction machine or building machine is forced to approach a wall surface of a house or building at the side surface of the vehicle and thereafter the vehicle is moved laterally relative to the wall surface. Especially, in a working machine having a vertically movable platform on which an operator works at an elevated spot (hereinafter referred to simply as a working machine), the working machine approaches the side of the building at a side surface thereof and the platform approaches the wall surface of the building, which results in improving working efficiently. That is, if the platform can be approached close to the wall surface, as by the vehicle being moved laterally until the operator's hand can touch the wall surface, this thereby facilitates painting on the wall surface or laying boards on the wall surface.

The prior art vehicle can cope with such a case by steering the front wheels while moving the vehicle to the front and rear so as to approach the wall surface, namely, by pulling the vehicle over to the side of the wall surface, which is however troublesome in operation and is not performed when there is no space to move the vehicle to the front and rear.

Accordingly, there is a desire to provide a vehicle capable of moving laterally at right angles relative to the normal traveling direction. To achieve this object, there is known a vehicle capable of turning the wheels supporting the vehicle chassis in the horizontal direction so that all the wheels can move at right angles relative to the traveling direction, whereby the vehicle can move laterally. There is another known vehicle which can move laterally by a special push car which is accommodated in the lower portion of the vehicle. However, such a prior art vehicle becomes heavy at the lower portion thereof and the structure becomes complex, whereby such a vehicle has not been commonly used. To meet the need, there is thus desired a mechanism with a simple structure and capable of moving laterally relative to the traveling direction.

SUMMARY OF THE INVENTION

It is an object of the present invention to provide a vehicle having a chassis and movable mechanisms respectively disposed at front and rear portions of the chassis, with each movable mechanism comprising a pair of lifting means capable of floating the chassis upward and a slide means connected to the lower portion of said lifting means and capable of moving laterally while contacting the ground.

According to the present invention, it is possible to lift the entire chassis by the lifting means so that the lower portion of the wheels or crawlers can be floated from the ground and thereafter the chassis can be slid laterally. As a result, for example, it is possible to move the chassis freely toward the side surface of a house or building to a necessary amount. When the chassis is not moved laterally, the lifting mechanisms lift the entire chassis and the slide mechanism operates like an outrigger while contacting the ground, thereby stabilizing the chassis against vibration or load variations.

DETAILED DESCRIPTION

A laterally movable mechanism of a preferred embodiment will be described with reference to the accompanying drawings.

The vehicle as described hereinafter relates to a working machine provided with an X-shaped lifting mechanism mounted thereon capable of moving a platform up and down.

Figure 1:
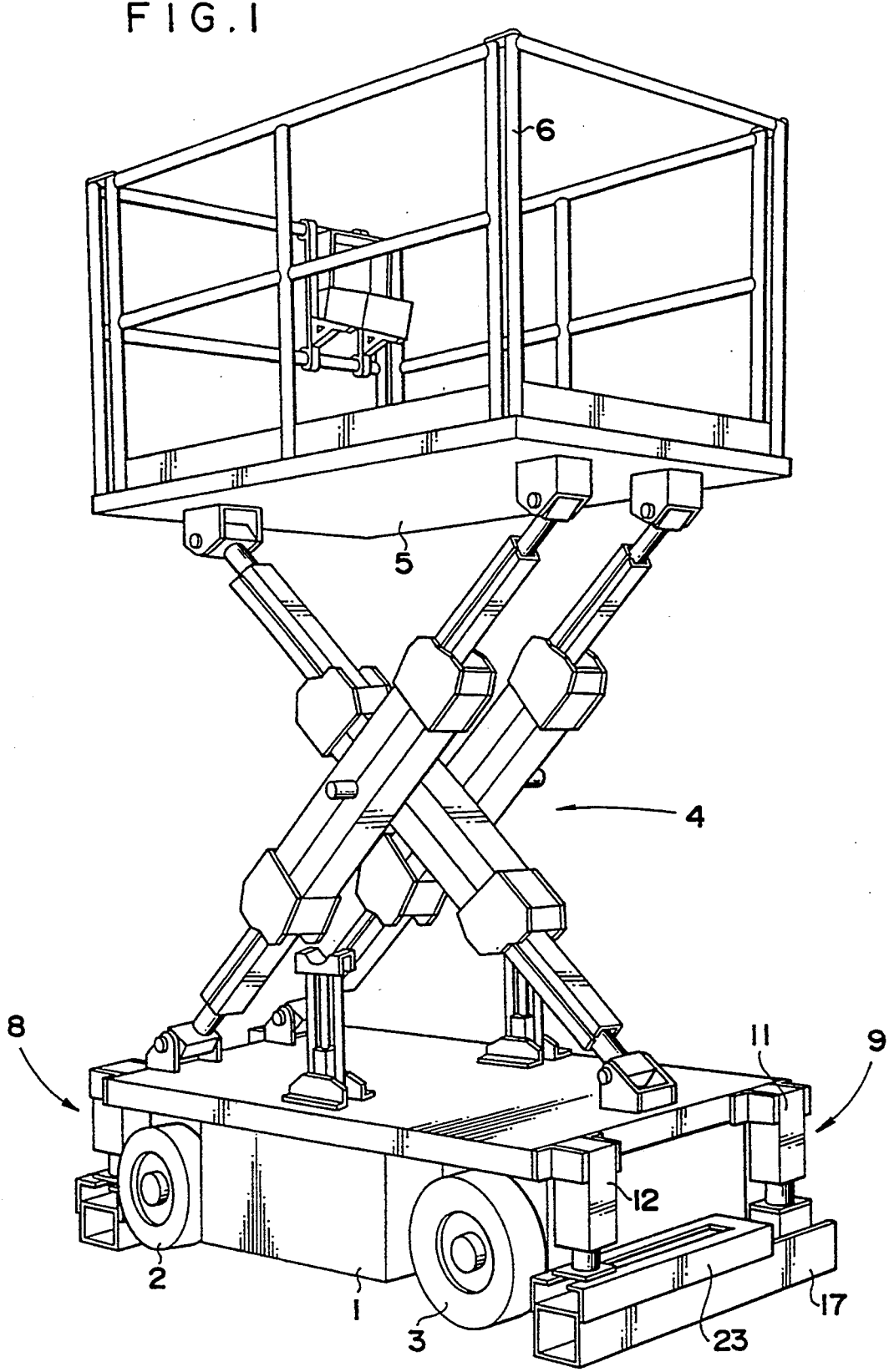
FIG. 1 is a perspective view showing an overall arrangement of a working machine provided with a laterally movable mechanism of the invention.
Figure 2:
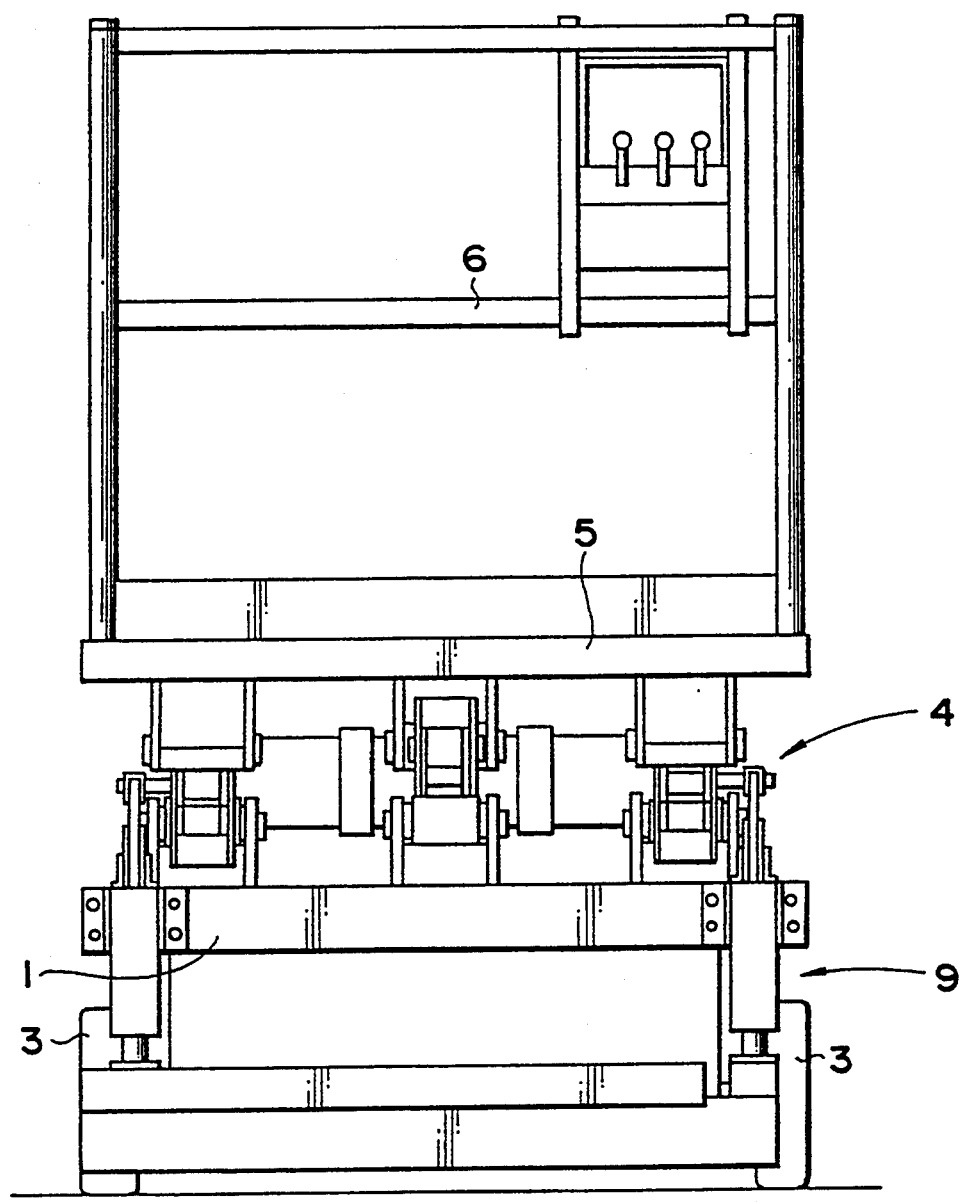
FIG. 2 is a front view of the working machine wherein a platform is at its lowest position.

FIG. 1 is a perspective view showing an overall arrangement of the working machine provided with the laterally movable mechanism of the invention, and FIG. 2 is a front view of the working machine wherein the platform is positioned at its lowest position.

A vehicle chassis 1 is supported by a pair of front wheels 2 and a pair of rear wheels 3 at left and right sides thereof, and the chassis 1 accommodates a hydraulic pressure generating source, etc. thereon. The front wheels 2 can be directed in a left or right direction interlocking with a steering mechanism, and hence they can turn their directions when the chassis 1 moves. The rear wheels 3 are connected, for example, to a hydraulic drive motor (not shown). When the rear wheels 3 are driven by the hydraulic motor, the chassis 1 can be moved on a road or ground. There is placed on the upper surface of the chassis a lifting mechanism 4 comprising a plurality of booms having an X-shape as a whole as viewed from its side in which each boom is stretchable. A platform 5 is mounted, at the lower surface thereof, on the upper ends of the lifting mechanism 4. A handrail 6 is fixed to the platform 5 at the upper peripheral surface thereof so as to prevent an operator from falling.

Movable mechanisms 8 and 9 are attached to the chassis 1 at the front and rear ends thereof. The movable mechanisms 8 and 9 can lift the chassis 1 and move the chassis 1 laterally, whereby the working machine is movable laterally (i.e. transversely) at right angles to the traveling direction of the chassis 1.

Figure 3:
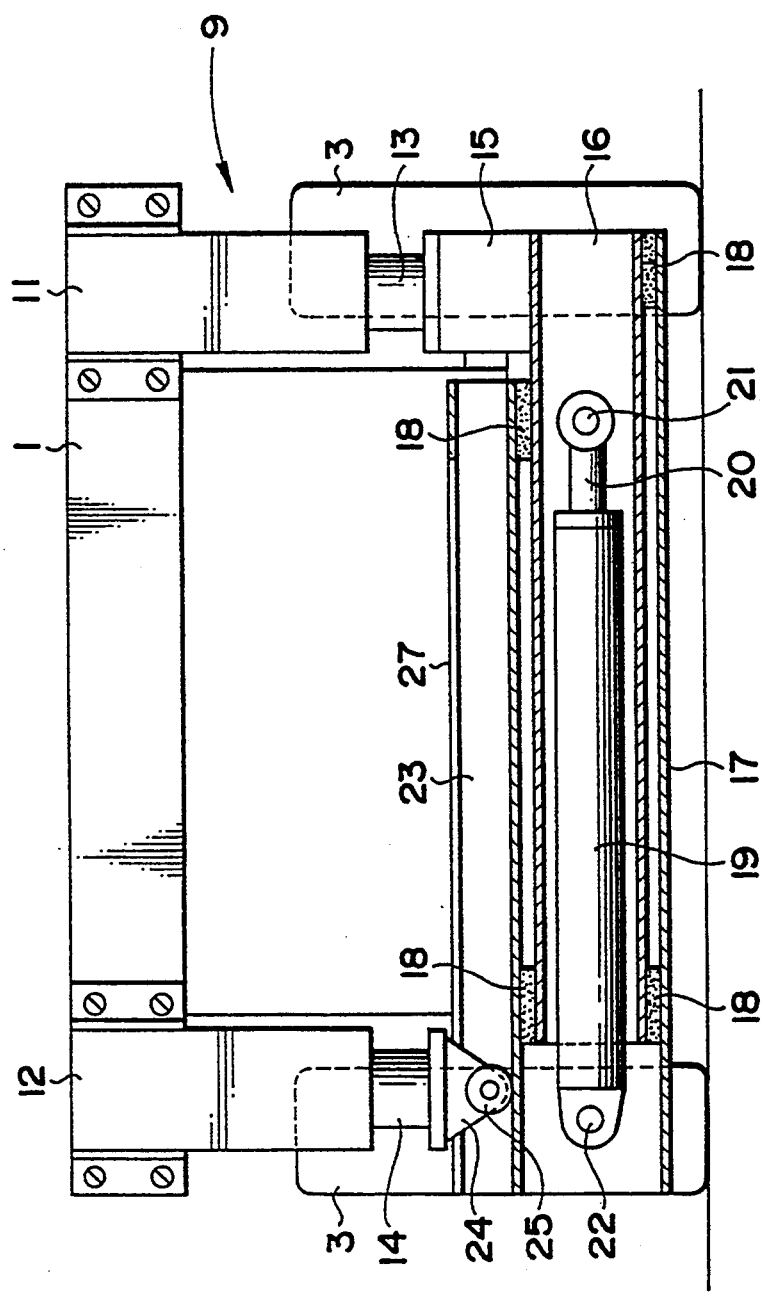
FIG. 3 is a longitudinal cross-sectional view showing the internal structure of a movable mechanism.
Figure 4:
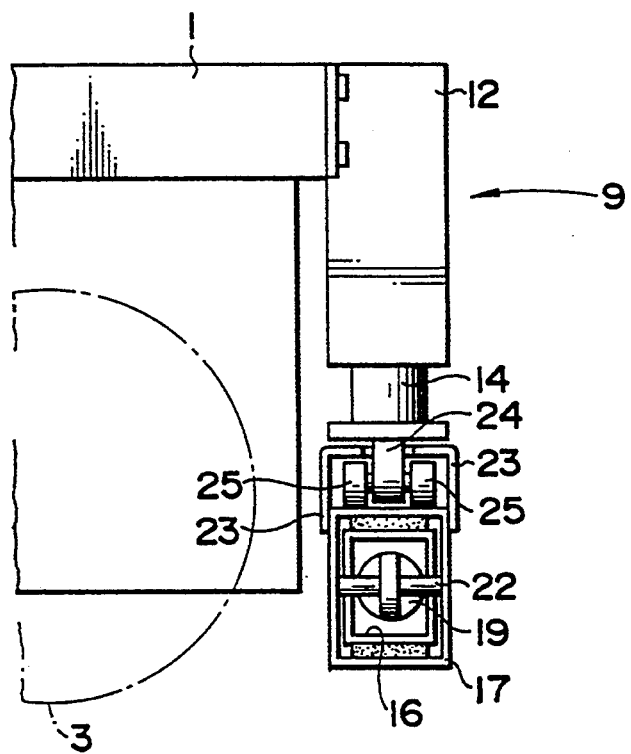
FIG. 4 is a lateral cross-sectional view of the movable mechanism of FIG. 3.
Figure 5:
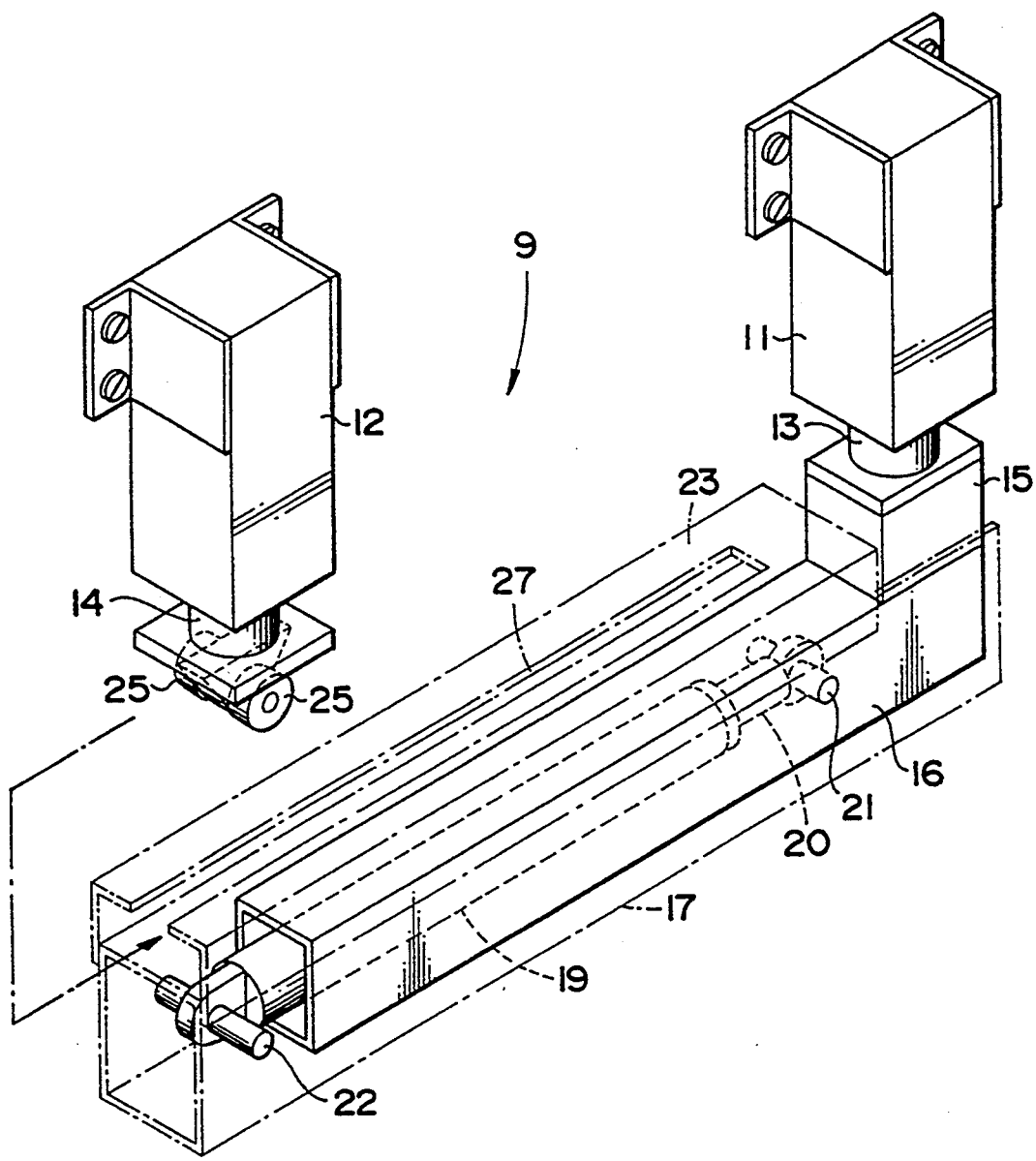
FIG. 5 is an exploded perspective view of the movable mechanism of FIG. 3 in which a part thereof is removed.

FIG. 3 is a longitudinal cross-sectional view showing the internal structure of the movable mechanism 9, FIG. 4 is a lateral cross-sectional view of the movable mechanism of FIG. 3, and FIG. 5 is an exploded perspective view of the movable mechanism 9 in which a part thereof is removed for explaining the structure of the movable mechanism in more detail. Although the structure of the movable mechanism 9 is explained with reference to FIGS. 3, 4 and 5, the explanation of the movable mechanism 8 is omitted since the structure and operation of the movable mechanism 8 is the same as that of the movable mechanism 9.

A pair of leg covers 11 and 12 are fixed to the rear end of the chassis 1 at right and left sides thereof with a spacing therebetween. The leg covers 11 and 12 are tubular and square in cross section and formed by bending a steel sheet. The leg covers 11 and 12 are hollow at the inside thereof and are fixed to the chassis 1 so that the axial directions thereof are respectively perpendicular to the chassis 1 and hence are vertical (i.e. perpendicular to the supporting ground or road). Fluid pressure and particularly hydraulic cylinders (not shown) are respectively accommodated in the leg covers 11 and 12 and are stretchable vertically. Stretchable legs 13 and 14 slidably project downwardly from the lower openings of the leg covers 11 and 12 and are connected to the hydraulic cylinders so as to be vertically extendible.

A connecting block 15 is fixed at the upper surface thereof to the lower end of the stretchable leg 13, and is also fixed to one end of a fixed tubular element 16. The fixed element 16 is pipe-shaped and square in cross section and is formed by bending a steel sheet. The fixed cylinder 16 is elongate horizontally in the sideward direction (i.e. perpendicular to the traveling direction) and is hollow in its longitudinal direction. The stretchable leg 13, connecting block 15, and fixed element or tube 16 have an L-shape configuration as viewed from the rear of the vehicle.

A movable tubular element 17 is telescopically movable from the tip or free end of the fixed tube 16 (left side in FIGS. 3 and 5) toward the other end of the fixed tube 16 in the longitudinal direction thereof, whereby the tube 16 is relatively slidable into the movable element 17. The movable element 17 is also a pipe-shaped, hollow, elongate member which is square in cross section and is formed by bending a steel sheet. The inner cross-section of the movable tube 17 is greater than the outer cross-section of the fixed tube 16 so that they form a telescopic structure capable of relatively moving telescopically. A plurality of sliders 18 made of a sliding bearing material such as an MC nylon are interposed between the outer wall of the fixed tube 16 and the inner wall of the movable tube 17 whereby the movable tube 17 is smoothly slidable relative to the fixed tube 16.

The fixed tube 16 is hollow at the inside thereof in the longitudinal direction and is open at both ends thereof, and a fluid pressure (i.e. hydraulic) cylinder 19 is provided inside the fixed tube 16. The longitudinal direction of the hydraulic cylinder 19 conforms to that of the fixed tube 16. A movable cylinder rod 20 is coupled to and projects from one end of the hydraulic cylinder 19. The cylinder rod 20 is coupled at the free end thereof to the fixed tube 16 by a pin 21, while the base or remote end of the hydraulic cylinder 19 is coupled to the movable tube 17 by a pin 22 which is disposed adjacent the free end of the tube 17. A channel-shaped guide chassis 23 having a downwardly-directed U-shaped cross section is fixed to the upper surface of the movable tube 17. A space which is square in cross section is formed between the inner surface of the channel-shaped guide chassis 23 and the upper surface of the movable tube 17. An elongate guide groove 27 is formed through and longitudinally along the upper wall of the channel-shaped guide chassis 23 straight from one end in the longitudinal direction thereof (left end in FIGS. 3 and 5).

A triangular roller receiver 24 is fixed to the lower end of the stretchable leg 14 and has a projection at the lower portion thereof which is directed downward. A pair of rollers 25 are rotatably supported by the roller receiver 24 at right and left sides thereof. The rollers 25 are positioned within the space formed between the channel-shaped guide chassis 23 and the movable tube 17, while the roller receiver 24 projects through the guide groove 27. Accordingly, the rollers 25 are movable between the upper surface of the movable tube 17 and the inner surface of the channel-shaped guide chassis 23 in the longitudinal direction thereof, but they are restricted against movement in the vertical direction. The rollers 25 maintain the vertical position of the channel-shaped guide chassis 23 and the movable tube 17, and assure only horizontal movement of the channel-shaped guide chassis 23 and movable tube 17.

The operation of the laterally movable mechanism of the invention will be described hereinafter.

When the working machine is operated, an engine (not shown) accommodated in the chassis 1 drives a hydraulic pressure generating source. Hydraulic pressure generated by the hydraulic pressure generating source is supplied to each component of the working machine. The hydraulic motor (not shown) which is driven by the hydraulic pressure drives the rear wheels 3 and at the same time front wheels 2 are steered, whereby the working machine can be turned or steered in a different direction while moving in the longitudinal direction thereof. Thus, the working machine can move freely on the ground or road and is moved to a given position. Successively, the hydraulic cylinders accommodated in the lift mechanism 4 are operated to thereby extend the booms of the lifting mechanism 4 so that the lifting mechanism 4 is expanded so as to form the X-shape as a whole. Consequently, the platform 5 mounted on the lifting mechanism 4 is lifted upward, which eventually lifts the operator to a given height. This operation is the same as that of the known working machine, and hence the detailed explanation is omitted.

Figure 6A:
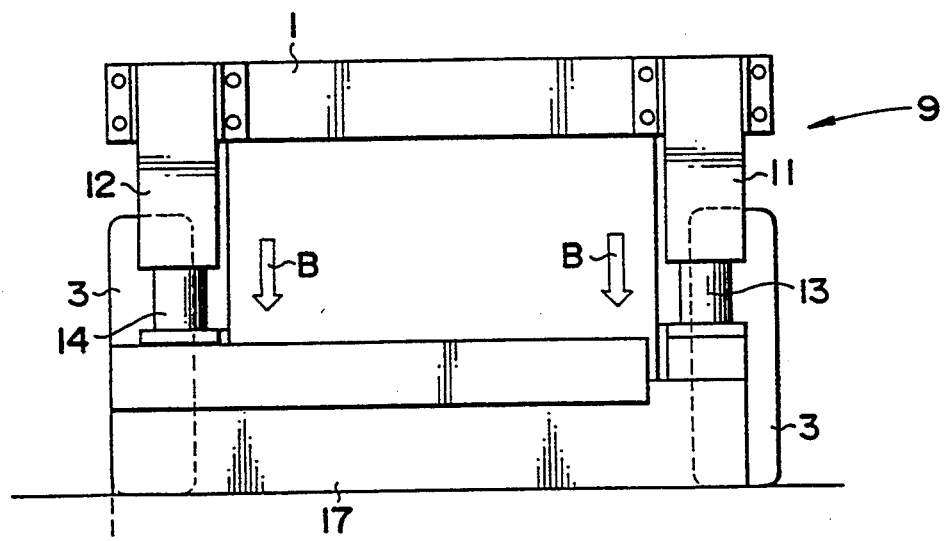
FIGS. 6(A) and 6(B) are views explaining the operations of the laterally movable mechanism of the invention.

Described hereinafter is the case where the chassis 1 is moved to a given position, especially the case where the chassis 1 is moved laterally as a whole relative to the wall surface of a housing or building after the side surface of the chassis 1 is positioned close to the wall of the house or building and the vehicle is thereafter stopped. The operation will be described with reference to FIGS. 6(A) and 6(B).

The hydraulic cylinders accommodated in the leg covers 11 and 12 of the front and rear movable mechanisms 8 and 9 are operated to thereby push the stretchable legs 13 and 14 downward (FIGS. 2, 3 and 4 show the state where the stretchable legs 13 and 14 are lifted or contracted so as to be at maximum height). Since the stretchable legs 13 and 14 are pushed in the direction of the arrow B in FIG. 6, the lower surface of the movable tube 17 of each mechanism 8 and 9 firmly contacts the ground or road. If the stretchable legs 13 and 14 are further pushed downward, the chassis 1 is relatively lifted upward. As a result, the front wheels 2 and the rear wheels 3 are moved upwardly away from the ground or road so that they are floated together with the chassis 1.

Since the chassis is held by the movable tubes 17 when the stretchable legs 13 and 14 are pushed downward, the movable tubes 17 operate like outriggers. In this state, the chassis is held stably without resorting to the front wheels 2 and rear wheels 3, and the platform 5 does not sway due to vibration or wind even if the lifting mechanism 4 extends, which assures safe working by the operator.

Successively, to move the chassis 1 laterally as a whole so that the side surface of the platform 5 approaches the wall surface of the housing or building, hydraulic oil is supplied to the hydraulic cylinder 19 of each mechanism so that the cylinder rod 20 is pushed out of the hydraulic cylinder 19. When the cylinder rod 20 extends, the interval between the pins 21 and 22 is increased so that the respective fixed tube 16 is pushed out of the respective movable tube 17, rightward in FIGS. 3 and 6(B). Since the lower surface of each movable tube 17 contacts the ground or road, the movable tube 17 does not move from its own position contacting the ground or road, whereby the fixed tube 16 moves relative to the movable tube 17. Accordingly, the fixed tube 16 is pushed out of the movable tube 17 in FIG. 6(B). At this time, the rollers 25 roll and move on the upper surface of the movable tube 17 and the chassis 1 moves in the direction of the arrow C in FIG. 6(B). Since the movable tube 17 contacts the ground or road and does not move, the chassis 1, lifting mechanism 4 and platform 5 move laterally relative to the movable tube 17. In such a manner, the fixed tube 16 is movable smoothly from the movable tube 17 by the sliding operation of each slider 18 when the fixed tube 16 and the movable tube 17 relatively extend since the sliders 18 are interposed between the contacting surfaces thereof.

Figure 6B:
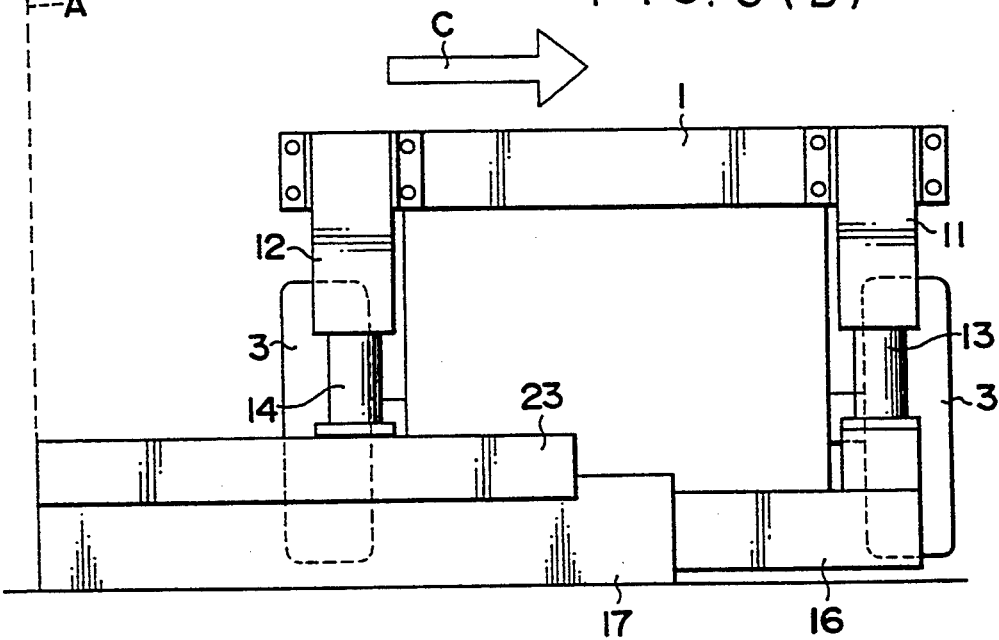

The following operation must be performed to cause the side surface of the platform 5 to approach closer to the wall surface after the movement of the chassis 1 in the direction of the arrow C as illustrated in FIG. 6(B).

The hydraulic cylinders accommodated in the covers 11 and 12 are contracted and the stretchable legs 13 and 14 are lifted upward when in the state where the fixed tubes 16 are extended from the movable tubes 17 as illustrated in FIG. 6(B). The movable tubes 17 are thus lifted from the ground or road by contraction of the legs 13 and 14 so that the front and rear wheels 2 and 3 again contact the ground or road. Thereafter, hydraulic oil is reversely supplied to the hydraulic cylinder 19 of each mechanism so that the cylinder rod 20 is pulled inside the hydraulic cylinder 19. Accordingly, the movable tube 17 is contracted over the fixed tube 16. Since the rollers 25 contact and roll on the upper surface of the movable tube 17 even at this time, the stretchable leg 14 and the movable tube 17 are movable relative to each other by way of the rollers 25. By this operation, the fixed tube 16 is again accommodated inside the movable tube 17 so that tubes 16–17 are returned to the state illustrated in FIGS. 2, 3 and 6(A). However, since the chassis 1 remains in the position as previously moved in the direction of the arrow C from the reference line A, the fixed tube 16 is now telescopically contracted in the movable tube 17 at the position where the chassis 1 was previously laterally moved.

Thereafter, the hydraulic cylinders accommodated in the leg covers 11 and 12 are extended to thereby push the stretchable legs 13 and 14 downward whereby the chassis 1 is fixed to the ground or road by the movable tubes 17. Successively, the hydraulic cylinders 19 are operated to thereby pull the fixed tubes 16 from the movable tubes 17 so that the chassis 1 is moved further in the direction of the arrow C. With the repetition of these operations, the chassis 1 performs the operation like a sideward crawl of a crab so that the chassis 1 can be moved laterally perpendicular to its traveling direction little by little. With the repetition of a series of operations, the entire chassis 1 can be moved to an intended position so that the platform 5 can be laterally moved so as to be positioned closely adjacent the wall surface of the housing or building.

According to the laterally movable mechanism having such an arrangement of the present invention, it is possible to move the vehicle in a direction perpendicular, i.e. laterally to the traveling direction without changing the driving mechanisms of the vehicle. When the vehicle is not moved, the vehicle can be lifted upward while the lower surface of the slide mechanism contacts the ground so that the laterally movable mechanism can operate like the prior art outrigger. Accordingly, the laterally movable mechanism of the invention can serve to enhance the stability of the vehicle during the working and to perform the lateral movement of the vehicle, which improve the operability of the vehicle having a special working intention such as a construction machine, building machine and earth machine.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A laterally movable mechanism of a vehicle comprising a movable chassis and movable mechanisms respectively disposed adjacent front and rear ends of the chassis, each said movable mechanism comprising a pair of lifting means capable of floating the chassis upward and slide means connected to a lower portion of said lifting means and capable of moving laterally while contacting the ground, each of said pair of lifting means comprising a pair of leg covers which are fixed to said chassis adjacent one said end thereof and which extend in an axial direction thereof perpendicular to said chassis, and stretchable legs which are housed in said pair of leg covers and are stretchable downward from said leg covers, said stretchable legs being connected to said slide means at the other end thereof, said slide means comprising a first elongate member disposed substantially horizontally relative to the lateral direction of said chassis and a second elongate member which is movable relative to said first elongate member in the longitudinal direction thereof, said first member being slidable into said second member, and said second member being capable of contacting the ground by a lower surface thereof.

2. A laterally movable mechanism of a vehicle according to claim 1, wherein the lower end of one stretchable leg is connected to one end of said first member while the lower end of another stretchable leg is connected to said second member so as to be relatively movable only in the longitudinal direction of said second member.

* * * * *